United States Patent
Van De Walle et al.

(10) Patent No.: US 10,123,505 B2
(45) Date of Patent: Nov. 13, 2018

(54) MILK PUMP DEVICE AND METHOD FOR DISPLACING AN AMOUNT OF MILK

(75) Inventors: Jacobus Izaak Van De Walle, Nuenen (NL); Michiel Adriaan Van Dorp, Hazerswoude (NL); Gerard Mostert, Schipluiden (NL)

(73) Assignee: Lely Patent N.V., Maassluis (NL)

( * ) Notice: Subject to any disclaimer, the term of this patent is extended or adjusted under 35 U.S.C. 154(b) by 1470 days.

(21) Appl. No.: 13/457,518

(22) Filed: Apr. 27, 2012

(65) Prior Publication Data

US 2012/0244016 A1 Sep. 27, 2012

Related U.S. Application Data

(63) Continuation of application No. PCT/NL2010/000149, filed on Oct. 21, 2010.

(30) Foreign Application Priority Data

Oct. 31, 2009 (NL) ...................................... 1037427

(51) Int. Cl.
*A01J 5/01* (2006.01)
*F04B 43/00* (2006.01)
(Continued)

(52) U.S. Cl.
CPC .............. *A01J 5/01* (2013.01); *F04B 43/0081* (2013.01); *F04B 43/02* (2013.01); *F04B 49/065* (2013.01); *F04B 2201/02071* (2013.01)

(58) Field of Classification Search
CPC .......... F04B 43/02; F04B 43/06; F04B 45/04; F04B 45/053; F04B 49/12; F04B 2205/09;
(Continued)

(56) References Cited

U.S. PATENT DOCUMENTS 3,250,225 A * 5/1966 Taplin ......................... 417/413.1
3,765,568 A * 10/1973 Leifermann ..................... 222/56
(Continued)

FOREIGN PATENT DOCUMENTS

AU 459745 A 3/1972
DE 3216537 A1 11/1983
(Continued)

OTHER PUBLICATIONS

International Search Report of PCT/NL2010/000149 dated Jul. 1, 2011.

*Primary Examiner* — Essama Omgba
*Assistant Examiner* — Charles W Nichols
(74) *Attorney, Agent, or Firm* — Hoyng Rokh Monegier LLP; Ramin Amirsehhi

(57) ABSTRACT

A milk pump device, comprising a passage duct, a first one-way valve, a second one-way valve and a membrane pump. The first and second one-way valves are included in the passage duct and oriented in the same direction relative to each other. The membrane pump is positioned between the first one-way valve and the second one-way valve. The membrane pump forms a first milk meter for generating a first milk measurement with respect to a number of complete pumping strokes of the membrane pump. The milk pump device further comprises a second milk meter for carrying out a second milk measurement with respect to a residual pumping stroke.

17 Claims, 4 Drawing Sheets

(51) Int. Cl.
*F04B 43/02* (2006.01)
*F04B 49/06* (2006.01)

(58) Field of Classification Search
CPC ............... F04B 43/0081; F04B 49/065; F04B 2201/02071; A01J 5/01; A01J 5/007
USPC ..... 417/43, 53, 63, 212, 394, 395, 412, 559; 702/100
See application file for complete search history.

(56) References Cited

U.S. PATENT DOCUMENTS

| | | | | |
|---|---|---|---|---|
| 4,231,324 | A | | 11/1980 | Schletter |
| 4,305,281 | A | * | 12/1981 | Lee et al. .................... 73/195 |
| 4,809,549 | A | * | 3/1989 | David .......................... 73/271 |
| 5,056,036 | A | * | 10/1991 | Van Bork .................. 700/282 |
| 5,720,236 | A | * | 2/1998 | Carrano et al. ........... 119/14.46 |
| 5,846,061 | A | * | 12/1998 | Ledebuhr et al. ......... 417/477.9 |
| 2005/0058548 | A1 | * | 3/2005 | Thomas et al. ................ 417/43 |
| 2007/0113790 | A1 | * | 5/2007 | Akerman ................... 119/14.02 |
| 2009/0171502 | A1 | * | 7/2009 | Freidin ........................ 700/240 |
| 2010/0132451 | A1 | * | 6/2010 | Bohm et al. .................. 73/200 |

FOREIGN PATENT DOCUMENTS

| | | |
|---|---|---|
| NL | 1002969 C | 1/1998 |
| WO | 8503409 A1 | 8/1985 |

\* cited by examiner

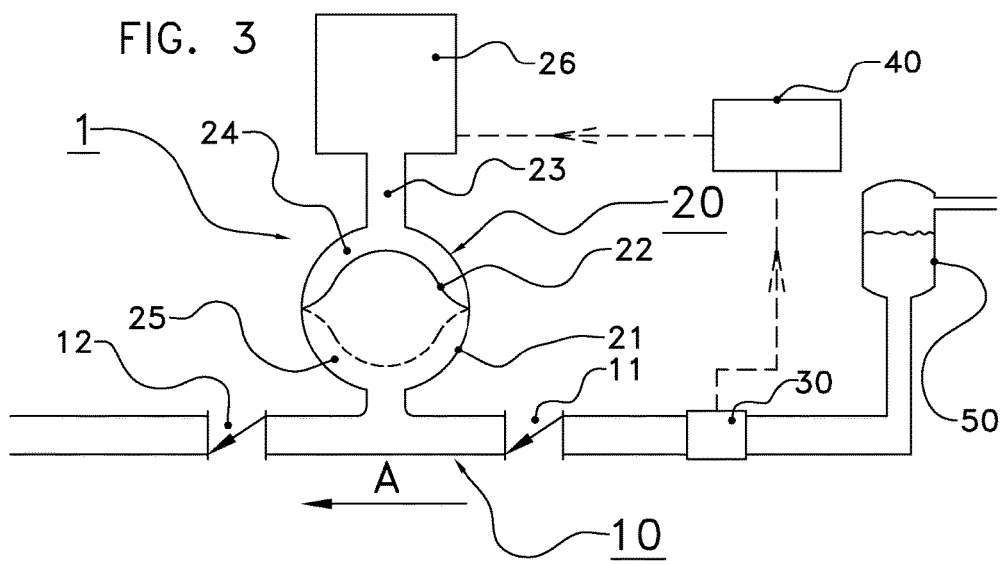
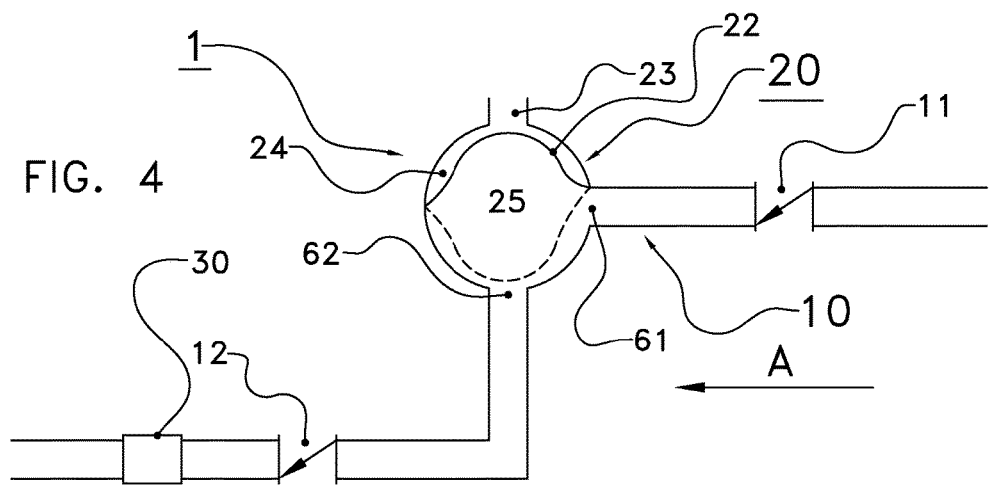
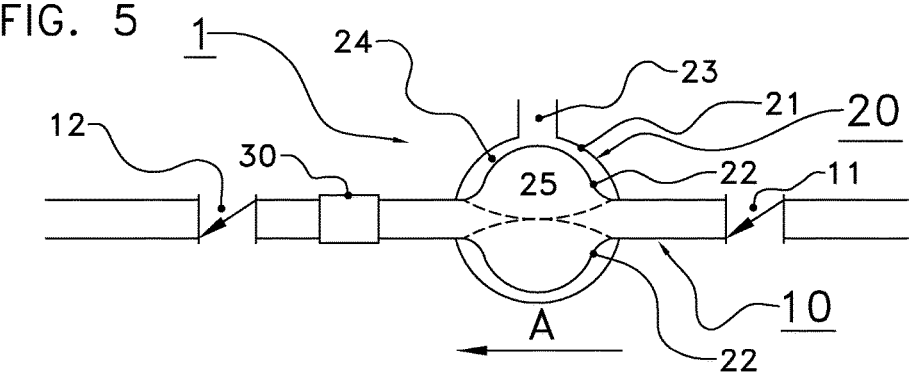

MILK PUMP DEVICE AND METHOD FOR DISPLACING AN AMOUNT OF MILK

CROSS REFERENCE TO RELATED APPLICATIONS

This application is a continuation of PCT application number PCT/NL2010/000149 filed on Oct. 21, 2010, which claims priority from Netherlands application number 1037427 filed on Oct. 30, 2009. Both applications are hereby incorporated by reference in their entireties.

BACKGROUND OF THE INVENTION

1. Field of the Invention

The present invention relates to a milk pump device, a milking device comprising a milk pump device, and a method for displacing an amount of milk.

2. Description of the Related Art

A milk pump device can be used for displacing an amount of milk, for example for displacing an amount of milk collected in a milk glass to a further processing device or a milk storage. The milk pump device can be disposed in a milk line.

A milk pump device is known from British patent application no. GB2192673. GB2192673 discloses a milk pump device which is shown schematically in FIG. 1. The milk pump device (1) comprises a passage duct 10, a first one-way valve 11, a second one-way valve 12 and a membrane pump 20. The first and second one-way valves 11, 12 are included in the passage duct 10 and oriented in the same direction relative to each other. In this manner there is defined a flow direction through the passage duct in the passage direction of the one-way valves 11, 12. The flow direction is indicated by arrow A in FIG. 1. The use of a membrane pump has the advantage that no air is taken in, so that no or at least little air can enter the milk. A further advantage of the use of a membrane pump is that the milk is not damaged by the pumping and, for example, fat structures present in the milk are not damaged. The use most other types of pumps may, on the contrary, lead to damage of milk fat structures or to undesirable mixing of air and milk.

The membrane pump 20 is positioned between the first one-way valve 11 and the second one-way valve 12. The membrane pump 20 is also called a membrane compressor or diaphragm compressor.

The membrane pump 20 comprises a pump chamber 21, with a membrane 22 included therein. The membrane 22 divides the pump chamber 21 into a first space 24 and a second space 25. The membrane 22 prevents transport of gas and/or liquid between the first space 24 and the second space 25. Owing to the fact that the membrane 22 has a certain degree of flexibility, the volumes of the first space 24 and the second space 25 may vary relative to each other.

The first space 24 is, via an opening 23, closably connected with a (high pressure) supply (not shown), for example compressed air or a pump. The second space 25 is in connection with the passage duct 10.

The functioning of the membrane pump 20 will be described briefly hereinafter. There is started from an initial position of the membrane 22 (first position) in which the volume of the first space 24 is almost maximal and the volume of the second space 25 is almost minimal.

If the supply of high pressure gas via opening 23 is stopped, milk flows into the second space 25 via the first one-way valve 11 and presses the membrane 22 away from the first position so that the volume of the first space 24 is reduced. The membrane 22 then assumes a second position.

Under the influence of pressure or gravitational force, the milk can flow into the second space 25 of the pump chamber 21. This can also take place or be promoted by sucking air, via opening 23 (or another not shown opening), from the first space 24, for example by means of a (vacuum)pump (not shown). The membrane 22 will now be forced into the second position, in which the volume of the first space 24 is almost minimal and the volume of the second space 25 is almost maximal.

The first space 24 can subsequently be filled via opening 23, so that the volume of the first space 24 is increased and the volume of the second space 25 is reduced. The membrane 22 then moves from the second position (shown by a solid line in FIG. 1), to the first position (shown by a dotted line in FIG. 1). The milk present in the second space 25 will be discharged through the passage duct 10 in the flow direction A. The above-described cycle results in displacement of the milk through the passage duct 10 in the flow direction A.

The membrane 22 passing once through a cycle, for example from the first position to the second position and back to the first position, is called a pumping stroke.

In the above-described example of a membrane pump 20, a pumping stroke is defined, in which the pump displaces a fixed volume of milk per pumping stroke or per cycle.

There may be performed a number of pumping strokes in order to displace an amount of milk in the flow direction A.

The milk pump device can be used for displacing an amount of milk which has, for example, just been obtained from a dairy animal. In this case it is of importance that the amount of milk obtained is measured with a certain degree of accuracy. In this manner it is possible, for example, to record the amount of milk obtained per dairy animal or the total amount of milk obtained from a number of dairy animals can be determined. This can take place by measuring the amount of milk displaced. However, a disadvantage of the flexible membrane is that by means of such a membrane pump the displaced volume of a partial or residual pumping stroke cannot be identified (accurately).

The present invention aims at providing a milk pump device of the described type by means of which the amount of displaced milk can be measured relatively accurately.

BRIEF SUMMARY OF THE INVENTION

This object is achieved by a milk pump device, as defined in claim 1.

By combining a milk pump device with a membrane pump and a second milk meter it is possible to determine relatively accurately the (total) amount of milk displaced by the milk pump device. This can take place by determining how many (complete) pumping strokes are required for the membrane pump to displace the amount of milk. The membrane pump is thus used as a first milk meter. In this entire application, the term "milk meter" refers to a milk amount meter, and the term "milk measurement" refers to a milk amount measurement. The totally displaced amount of milk is then composed of a first amount, which is measured by the first milk meter, i.e. the membrane pump, and of a second amount, which is measured by the second milk meter.

The amount of milk displaced by the membrane pump per complete pumping stroke is accurately known or can be accurately determined. Only for the last pumping stroke is the amount of milk displaced by the membrane pump unknown, because this will in general be an incomplete pumping stroke in which the membrane pump will displace a smaller amount of milk. The amount of milk displaced by the last pumping stroke can be determined by means of the second milk meter. The total amount of displaced milk can now be determined relatively accurately on the basis of the number of pumping strokes performed and the amount of milk displaced in the last pumping stroke and determined by the milk meter.

The use of the membrane pump as a first milk meter in combination with a second milk meter has the advantage that it is not necessary to rely only on the second milk meter as regards the amount of displaced milk. Such second milk meters for measuring larger volumes with the required degree of accuracy are relatively expensive, and cheaper second milk meters are relatively inaccurate.

However, providing a milk pump device with a membrane pump as a first milk meter in combination with a second milk meter has the advantage that while using a relatively inaccurate second milk meter it is nevertheless possible to carry out, as a whole, accurate measurements on the amount of displaced milk. The greater part of the volume measurement takes place by counting pumping strokes, each of which displaces a precise volume. The (in)accuracy of the residual stroke measurement then affects the total measurement to a lesser extent.

According to an embodiment, there is provided a milk pump device, wherein the passage duct comprises a first one-way valve, a second one-way valve, wherein the first and second one-way valves are oriented in the same direction relative to each other, and wherein the membrane pump is positioned between the first one-way valve and the second one-way valve.

According to an embodiment, there is provided a milk pump device, wherein the milk pump device further comprises a control device, which is configured to control the membrane pump to perform a number of pumping strokes for displacing an amount of milk, wherein the control device is configured to record a first milk measurement, which is an indication of the number of required complete pumping strokes of the membrane pump, and a second milk measurement, which is an indication of an amount of milk displaced by a residual pumping stroke of the membrane pump.

The milk measurement of the residual pumping stroke, i.e. the last pumping stroke, and the number of performed complete pumping strokes can be stored by the control device and/or kept available for further processing. On the basis of this data, the amount of displaced milk can be determined relatively accurately.

According to an embodiment, there is provided a milk pump device, wherein the control device is further configured to determine the displaced amount of milk on the basis of the first milk measurement and the second milk measurement.

In this manner, the amount of displaced milk can be determined accurately. The membrane pump displaces a fixed amount of milk for each complete pumping stroke, which is strongly related to the construction of the membrane pump, for example the volume of the pump chamber. This amount can be determined from the specifications of the membrane pump or can be measured with a high degree of accuracy. A typical value is, for example, 3.25 liters per complete pumping stroke. In practice, the last pumping stroke will not be a complete pumping stroke, because the remaining amount of milk will not be exactly equal to 3.25 liters. This pumping stroke is called the residual pumping stroke. In theory, the residual pumping stroke can have an amount of milk of 0 liter.

Thus, the second milk meter need only be used for measuring the amount of milk displaced by the residual pumping stroke. Displacing a quantity of milk may require, by way of example, two complete pumping strokes and a residual pumping stroke in which another 1.1 liter is displaced, as can be measured by the second milk meter.

In this example, the first milk measurement is two complete pumping strokes, which means an amount of milk of 6.50 liters. The second milk measurement is then 1.1 liter. In total 7.60 liters of milk have been displaced. As only a small amount of milk is measured by the relatively inaccurate second milk meter, the accuracy of the determined total amount of milk displaced is higher than if the total amount of milk had been measured by the second milk meter.

According to an embodiment, there is provided a milk pump device, wherein the control device is configured to establish that a pumping stroke is the residual pumping stroke. In response to the establishing of the residual pumping stroke, the control device can, for example, initiate and/or record the second milk measurement.

According to an embodiment, there is provided a milk pump device, wherein the control device is configured to read in a milk measurement generated by the second milk meter at each pumping stroke. This may be advantageous because in certain cases the residual pumping stroke can only be established after it has taken place or after the amount of milk displaced by the residual pumping stroke has already passed the second milk meter.

According to an embodiment, there is provided a milk pump device, wherein the control device is configured to compare milk measurements generated by the second milk meter mutually or to compare them with a standard value and to identify a residual pumping stroke if a milk measurement generated by the second milk meter differs by more than a predetermined threshold value from the standard value.

The standard value is equal to the amount of milk displaced by the membrane pump per complete pumping stroke. If the second milk meter records every pumping stroke, it can be determined that the displaced amount of milk deviates at a specific pumping stroke, and the control device can identify the residual pumping stroke for displacing the amount of milk. The deviating milk measurement can subsequently be regarded as the second milk measurement. Depending on the position of the second milk meter, the residual pumping stroke is the last pumping stroke performed or the pumping stroke being performed at that moment.

According to an embodiment, there is provided a milk pump device, wherein the milk measurement generated by the second milk meter is regarded as the second milk measurement if the corresponding pumping stroke is the residual pumping stroke.

According to an embodiment, there is provided a milk pump device, wherein the control device is configured to control the second milk meter to carry out the second milk measurement if it has been established that the next or the current pumping stroke is the residual pumping stroke.

The residual pumping stroke can be identified in a number of ways described below in further detail. If the residual pumping stroke can be established before it can be measured by the second milk meter, the control device can control the second milk meter to carry out a milk measurement only with respect to the residual pumping stroke. In such an embodiment, it is not necessary to carry out a milk measurement by the second milk meter for each pumping stroke.

According to an embodiment, there is provided a milk pump device, wherein the milk pump device is configured to receive detection signals from a detection device and to identify the residual pumping stroke on the basis of the received detection signals.

The detection device may form part of the milk pump device, but may also be provided separately, for example as a component of a device provided in the proximity of the milk pump device, such as a milk glass which is located upstream of the membrane pump or a milk storage which is located downstream of the membrane pump. In this manner the residual pumping stroke can be identified in a simple and reliable manner.

According to an embodiment, there is provided a milk pump device, wherein the detection device comprises a liquid sensor disposed at a measuring position for generating a liquid signal, wherein the liquid signal forms an indication of the presence or absence of milk at the measuring position.

The liquid sensor may be positioned along the passage duct. On the basis of the liquid signal received by the control device, the control device can determine whether or not there is milk present at the measuring position. Depending on the position of the liquid meter and the moment of carrying out the measurement, the residual pumping stroke is the last pumping stroke performed, the pumping stroke being performed at that moment or the next pumping stroke to be performed.

According to an embodiment, there is provided a milk pump device, wherein the detection device comprises a membrane sensor for generating a position signal, wherein the position signal forms an indication of a position of the membrane.

The control device can be configured to read in the position signal and to identify the residual pumping stroke on the basis thereof. When the membrane does not completely return to the second position and the second space will consequently no longer completely be filled with milk, the pumping stroke being performed at that moment will be the last, incomplete residual pumping stroke. Alternatively, the control device can determine that, after the performance of a pumping stroke, the membrane remains in the first position, because no new milk flows into the second space. In that case, the last pumping stroke performed is the residual pumping stroke.

According to an embodiment, there is provided a milk pump device, wherein the membrane pump comprises a pump chamber with a membrane included therein, wherein the membrane divides the pump chamber into a first space and a second space, wherein the first space is in communication with a (high pressure) supply, and the second space is in communication with the passage duct by means of an inflow opening and an outflow opening.

In such an embodiment, the second space thus forms part of the passage duct in the sense that all the milk to be displaced flows through the second space.

Such a milk pump device has the advantage that, when the membrane has been brought into the first position by filling the first space, the membrane will close the passage duct. In this manner the passage duct will be closed in two directions without an extra valve or the like being required for the purpose.

The membrane can thus serve as a closing valve and there need not be provided a separate closing valve. This has the additional advantage that a membrane functioning as a closing valve can be cleaned in a simple manner, because only one side of it is in contact with the milk. A closing valve according to the state of the art is more difficult to clean, because it often has a shadow side and a valve stem, which are difficult to clean.

According to an embodiment, there is provided a milk pump device, wherein the membrane is designed as a hose, a first end of which is connected to the inflow opening and a second end of which is connected to the outflow opening.

Thus, the membrane which is designed as a hose forms part of the passage duct.

Such an embodiment has again the advantage that, when the membrane has been brought into the first position by filling the first space with a liquid or gas, the membrane closes the passage duct because the membrane will be closed over at least part of the length. According to a further aspect of the invention, there is provided a milking device, comprising a milk pump device as described above.

According to a further aspect of the invention, there is provided a method for displacing an amount of milk through a passage duct by means of a membrane pump included in the passage duct, wherein the method comprises:

controlling the membrane pump to perform a number of pumping strokes, generating a first milk measurement by means of a membrane pump which forms a first milk meter, which first milk measurement is an indication of a number of required complete pumping strokes for displacing the amount of milk, generating a second milk measurement by means of a second milk meter of an amount of milk displaced by a residual pumping stroke of the membrane pump, and determining the amount of displaced milk on the basis of the first milk measurement and the second milk measurement.

According to an embodiment, there is provided a method, wherein the method further comprises identifying the residual pumping stroke.

According to an embodiment, there is provided a method, wherein the method is applied by means of a milk pump device as described above, wherein the method further comprises filling the first space in order to close the passage duct.

BRIEF DESCRIPTION OF THE DRAWINGS

The invention will be explained in further detail with reference to accompanying figures. The figures, which may not be regarded in a restrictive sense, form practical embodiments of the invention. Specific detailed characteristics may also be considered apart from the embodiment, in a general sense as characterizing the invention, wherein:

FIGS. 2a-5 are schematic views of embodiments;

DESCRIPTION OF ILLUSTRATIVE EMBODIMENTS

Figure 1:
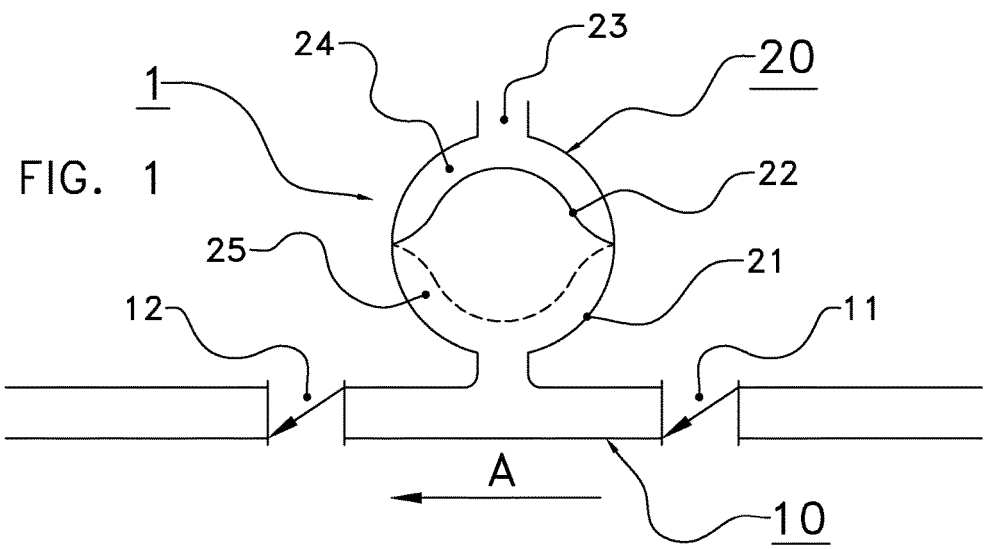
FIG. 1 is a schematic view of a milk pump device according to the state of the art.

The following is a description of certain embodiments of the invention, given by way of example only and with reference to the drawings. Referring to FIG. 1, a device 1 for milking a dairy animal, such as a cow, provided with teat cup 2, is shown. The features of the inventive method will be set out clearly in the description with respect to the device.

Figure 2A:
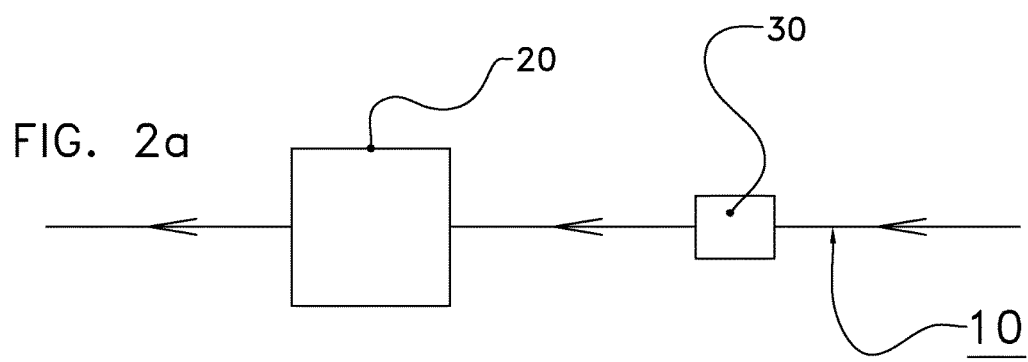
Figure 2B:
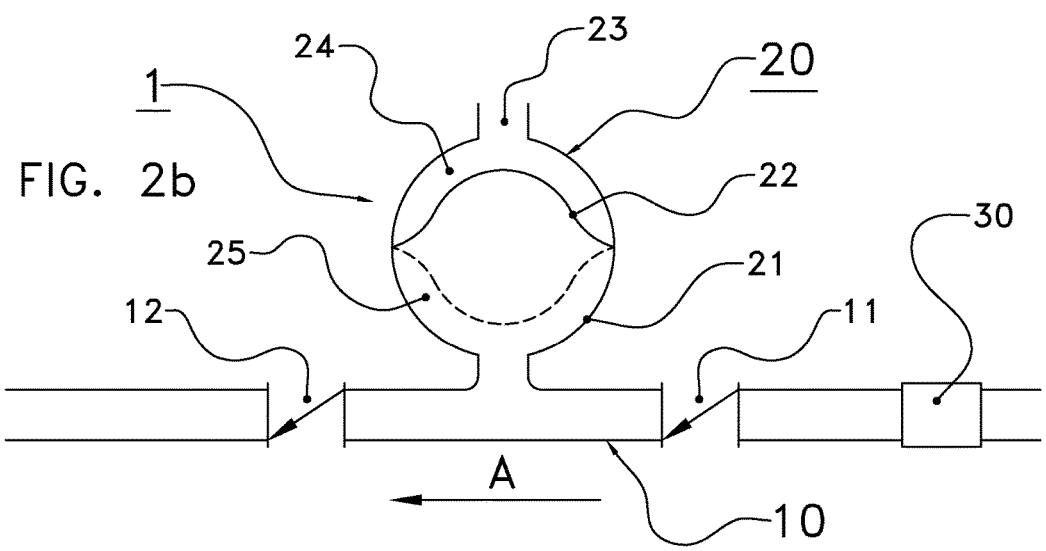

FIGS. 2a and 2b show a milk pump device 1 according to embodiments. The milk pump device shown in FIG. 2b shows similarities to the milk pump device as described above with respect to FIG. 1.

The milk pump device 1, shown in FIG. 2 shows a passage duct 10 with included therein a membrane pump 20 which forms a first milk meter, and a second milk meter 30.

FIG. 2b shows an embodiment with the membrane pump 20 in more detail. Thus, FIG. 2b shows a passage duct 10, a first one-way valve 11, a second one-way valve 12 and the membrane pump 20. The first and second one-way valves 11, 12 are included in the passage duct 10 and oriented in the same direction relative to each other. The membrane pump 20 is located between the first one-way valve 11 and the second one-way valve 12.

The membrane pump 20 forms a first milk meter for generating a first milk measurement with respect to a number of complete pumping strokes of the membrane pump 20.

The membrane pump 20 may be designed as described above with respect to FIG. 1.

A membrane pump is a pump which displaces a fixed volume of milk per pumping stroke or per cycle, of course only if sufficient milk is available. Therefore, such a membrane pump is a fixed volume pump.

The milk pump device 1 further comprises a second milk meter 30 for carrying out a second milk measurement with respect to a residual pumping stroke. The second milk meter 30 is schematically shown in FIGS. 2a and 2b. The second milk meter 30 may be located at any suitable position where it is possible to measure an amount of milk displaced by a pumping stroke of the membrane pump 20. The second milk meter 30 may, for example, be positioned in the passage duct 10.

In the embodiment shown in FIG. 2, the second milk meter 30 is positioned upstream of the membrane pump 20, in this case upstream of the first one-way valve 11. However, the second milk meter 30 may also be positioned downstream of the membrane pump 20, in this case downstream of the second one-way valve 12. The second milk meter 30 may also be positioned between the first one-way valve 11 and the second one-way valve 12. The downstream direction is defined here as the flow direction A.

The second milk meter 30 may be any quantity meter 30 that is suitable for measuring an amount of milk displaced through the passage duct 10. The second milk meter 30 may, for example, be a flow rate meter, a volume flow meter, a mass flow meter and/or a velocity meter. The speed of the displaced milk or the flow rate can, in combination with a time measurement, be converted to a volume or mass.

Examples of a flow meter are a pressure difference meter, a velocity meter (Pitot tube, anemometer), a displacement meter, a turbine or blade wheel, an ultrasonic flow meter, an electromagnetic flow meter, and a Coriolis mass flow meter.

FIG. 3 shows schematically a further embodiment. The embodiment shown in FIG. 3 further comprises a control device 40 for controlling the milk pump device 1. FIG. 3 shows a membrane pump 20.

FIG. 3 further shows a milk glass 50 from which the milk should be displaced to a further processing device or a milk storage.

The control device 40 may be designed as a computer, and may comprise hardware and software components which give the control device 40 the required functionality. The control device 40 is shown here as a single component. However, it will be obvious that the control device 40 may be formed by a plurality of components which are disposed at a distance from each other and which co-operative with each other, or may on the contrary form part of a larger control device, for example a control device for controlling a milking device, which comprises a plurality of milk pump devices 1.

FIG. 3 further shows a (high pressure) supply 26. The supply 26 may comprise a further pump or a storage with high pressure gas or liquid and is in connection with the first space 24 via opening 23. Via the supply 26, the first space can fill with gas or liquid in order to empty the second space 25 which is filled with milk. The supply 26 can be controlled by the control device 40. The control device 40 may be configured to control the membrane pump 20 to perform a number of pumping strokes for displacing an amount of milk.

The first space 24 may further comprise a non-shown exit through which the first space can be emptied. This exit may also be formed by opening 23.

The control device 40 is configured to record the first milk measurement, which is an indication of the number of required complete pumping strokes of the membrane pump 20, and the second milk measurement, which is an indication of an amount of milk displaced by a residual pumping stroke of the membrane pump 20.

By means of the first and the second milk measurement the control device 40 can determine the displaced amount of milk. Furthermore, the control device 40 can establish that a specific pumping stroke is the residual pumping stroke.

This is of importance, so that the number of complete pumping strokes can be determined and the second milk measurement of the residual pumping stroke can be recorded by means of the second milk meter 30.

The control device 40 can perform this in a number of ways, a few of which will be described here.

The control device 40 can simply make the second milk meter 30 perform a milk measurement at each pumping stroke and read in same. By comparing the values of the second milk meter 30 with each other or with a reference value, the residual pumping stroke can be identified. The residual pumping stroke will displace a deviating amount of milk through the passage duct 10.

The control device 40 can identify the residual pumping stroke also in other ways. There may, for example, be provided a detection device that are able to detect the residual pumping stroke. The detection device can establish whether or not milk is present at a specific measuring position, for example by means of a liquid sensor which can generate a liquid signal that indicates whether or not milk is present at a specific position. The liquid sensor may be formed by a conductivity sensor.

When, for example, no more milk is present upstream of the membrane pump 20, this will be an indication that the current or next pumping stroke (depending on the position of the detection device and the moment of carrying out the detection) is the residual pumping stroke. The detection device may also comprise a membrane sensor for measuring the position of the membrane 22. Such a membrane sensor may be formed by a distance meter, such as an ultrasonic sensor, for determining the distance of the membrane 20 and a specific reference position. It is thus possible to establish whether the membrane 22 when filling the second space 25 will completely return to the second position. If this is not the case, it can be established that the current pumping stroke is the residual pumping stroke.

FIG. 4 shows schematically a further embodiment. This embodiment comprises a membrane pump 20, wherein the second space 25 comprises an inflow opening 61 and an outflow opening 62, wherein the inflow opening 61 and the outflow opening 62 are connected to the passage duct 10. In this embodiment, the second milk meter 30 is positioned downstream of the second one-way valve 12, but it will be obvious that other positions are possible as well.

This embodiment has the advantage that, when the first space 24 is filled by supply 26 (not shown in FIG. 4) via the opening 23, the membrane 22 will close the passage duct 10. In the embodiment shown in FIG. 4, the membrane will be pressed against at least one of the inflow opening 61 and/or the outflow opening 62 and thus close the passage duct 10.

FIG. 5 shows schematically a further embodiment, which is a variant of the embodiment shown in FIG. 4. In the embodiment shown in FIG. 5, the membrane 22 is designed as a hose. The membrane 22 may substantially be cylindrical and may be provided with a first and a second end. The second space 25 comprises the inflow opening 61 and the outflow opening 62. Now, both ends of the membrane 22 can be connected to the inflow opening 61 and the outflow opening 62. In this manner the first space 24 and the second space 25 are formed. The second space 25 is formed by the inner side of the membrane 22 designed as a hose.

When, in this embodiment, the first space 24 is filled, the hose formed by the membrane 22 will be closed by pressing and thus form a closure of the passage duct 10.

In this embodiment, the second milk meter 30 is positioned between the second one-way valve 12 and the membrane pump 20, but it will be obvious that other positions are possible as well.

Of course, all embodiments shown can be combined with the control device 40 as described with reference to FIG. 3.

Method

Figure 6:
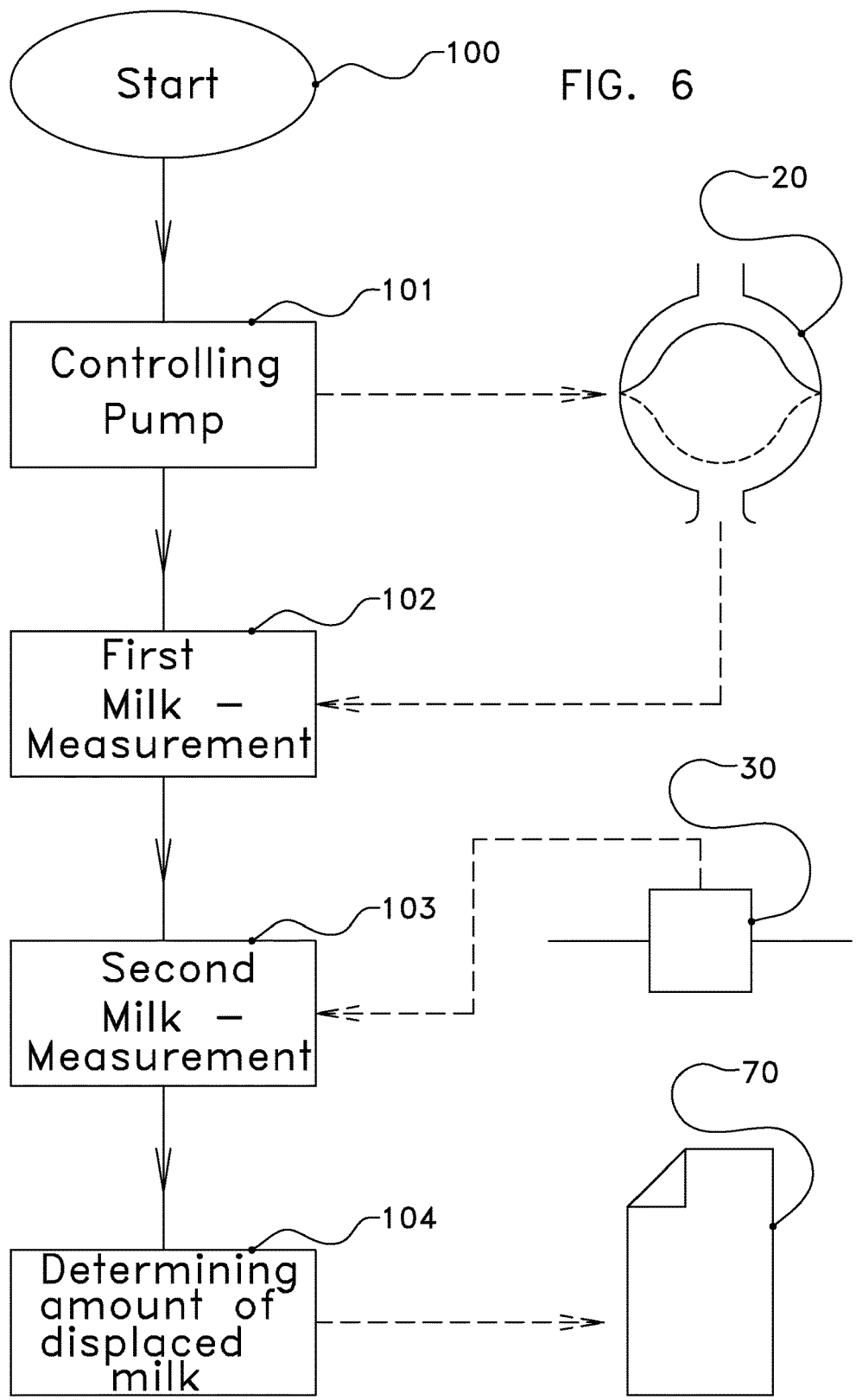
FIG. 6 is a schematic view of a method.

FIG. 6 shows schematically the steps which, according to an embodiment of the milk pump device 1, can be carried out under the control of the control device 40. As indicated above, the control device 40 may be designed as a computer. The control device may comprise a central processing unit (CPU) and a memory. The memory may comprise instructions which can be read and carried out by the processing unit and can thus provide the control device with the functionality in accordance with the embodiments described here.

The method can start, which is indicated schematically by a starting step 100.

Subsequently, in a next step 101, the membrane pump 20 can be controlled to displace an amount of milk, for example from the milk glass 50 to a further storage.

In a next step 102, a first milk measurement can be carried out by means of a membrane pump 20 which forms a first milk meter. The first milk measurement can be an indication of a number of required complete pumping strokes for displacing the amount of milk.

In a next step 103, a second milk measurement can be carried out by means of the second milk meter 30. The second milk measurement can be an indication of an amount of milk displaced by a residual pumping stroke of the membrane pump 20.

Furthermore, in a next step 104, the amount of displaced milk can be determined on the basis of the first milk measurement and the second milk measurement. The determined amount of displaced milk is shown schematically by reference numeral 70 in FIG. 6. The determined amount of displaced milk can be output or stored for later use. The determined amount of displaced milk can for example be presented to a user by means of a display screen. The determined amount of displaced milk can also be stored in a memory, so that it can be presented to a user or be processed at a later moment.

It will be obvious that, in FIG. 6, the membrane pump 20 as a first milk meter, the second milk meter 30 and a determined amount of displaced milk 70 are shown for illustrative purposes, but that they do not form part of the flow diagram.

The method may further comprise an action for identifying the residual pumping stroke. The residual pumping stroke can be determined in various manners, as already described. Determining the residual pumping stroke may take place as a part of step 101, or may be carried out as a separate step.

Following step 103 or 104, the method may comprise a closing step (not shown), wherein the passage duct 10 is closed by filling the first space 24. This applies to the embodiments with respect to FIGS. 4 and 5, wherein the membrane 20 can be used for closing the passage duct 10.

The method may further comprise a step for determining or calibrating the amount of milk displaced by a complete pumping stroke. This can take place in a number of ways.

This can, for example, take place by determining the amount of displaced milk by means of the second milk meter 30 during a large number of complete pumping strokes and by calculating, on the basis thereof, an average of the amount of milk displaced per complete pumping stroke. In this manner, accidental measuring errors of the second milk meter 30 are averaged. Another manner of carrying out a calibration is by completely filling the membrane pump and determining a weight difference between a filled pump and an empty pump.

Further Alternatives

Figure 7:
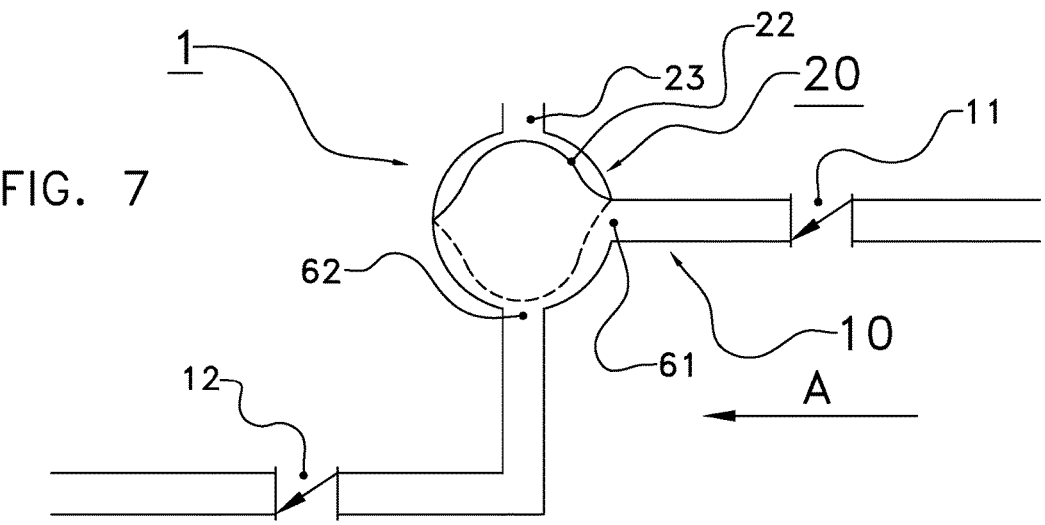
FIGS. 7 and 8 are schematic views of further embodiments.
Figure 8:
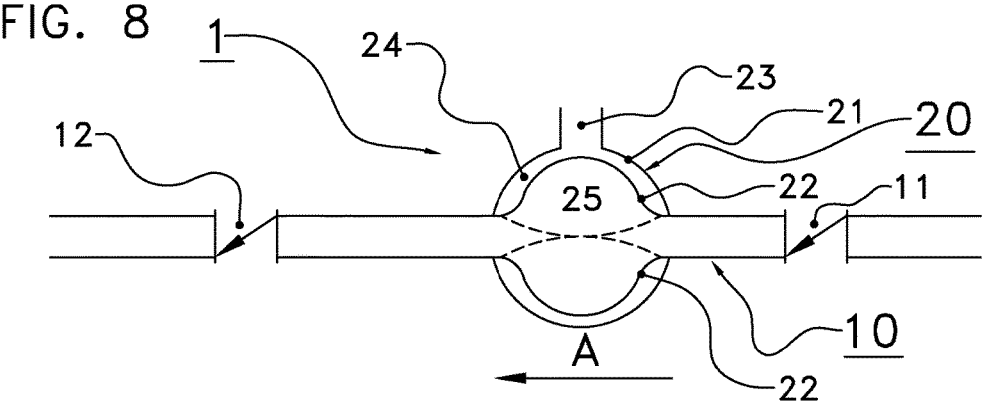

The milk pump devices shown in FIGS. 4 and 5 may also be applied without second milk meter 30. Examples thereof are shown in FIGS. 7 and 8. Such milk pump devices can be used advantageously, also apart from the above-described applications in which the membrane pump 20 was used as a first milk meter.

FIG. 7 is a schematic view of a milk pump device 1, comprising a passage duct 10, a first one-way valve 11, a second one-way valve 12 and a membrane pump 20, wherein the first and second one-way valves are included in the passage duct 10 and oriented in the same direction relative to each other, and wherein the membrane pump 20 is positioned between the first one-way valve 11 and the second one-way valve 12, wherein the membrane pump 20 comprises a pump chamber 21 with a membrane 22 included therein, wherein the membrane 22 divides the pump chamber 21 into a first space 24 and a second space 25, wherein the first space 24 is in connection with a supply 26, and the second space is in connection with the passage duct 10 by means of an inflow opening 61 and an outflow opening 62.

FIG. 8 further shows a variant, wherein the membrane 22 is designed as a hose, a first end of which is connected to the inflow opening 61 and a second end of which is connected to the outflow opening 62.

The use of milk pump devices as shown in FIGS. 7 and 8 has the advantage that, after displacing the amount of milk, the passage duct 10 can be closed in a simple manner, without extra components, such as extra closing means or valves, being required.

Further modifications in addition to those described above may be made to the structures and techniques described herein without departing from the spirit and scope of the invention. Accordingly, although specific embodiments have been described, these are examples only and are not limiting upon the scope of the invention.

What is claimed is:

1. A milk pump device, comprising a passage duct and a membrane pump for displacing milk through the passage duct, wherein the membrane pump forms a first milk meter for generating a first milk measurement of an amount of milk displaced by a number of complete pumping strokes of the membrane pump, and the milk pump device further comprises a second milk meter for carrying out a second milk measurement of only an amount of milk displaced by a residual pumping stroke, the first and second milk measurements together representing the total amount of the milk displaced by the milk pump device;

wherein the milk pump device further comprises a control device, which is configured to control the membrane pump to perform a number of pumping strokes for displacing an amount of milk, wherein the control device is configured to:

record the first milk measurement, which is determined based on the number of required complete pumping strokes of the membrane pump, record the second milk measurement, which is an indication of only an amount of milk displaced by a residual pumping stroke of the membrane pump, and to determine the total amount of the milk displaced by the milk pump device on the basis of said recorded first and second measurements.

2. The milk pump device according to claim 1, wherein the passage duct comprises a first one-way valve and a second one-way valve, wherein the first and second one-way valves are oriented in the same direction relative to each other, and wherein the membrane pump is positioned between the first one-way valve and the second one-way valve.

3. The milk pump device according to claim 1, wherein the control device is further configured to determine the displaced amount of milk on the basis of the first milk measurement and the second milk measurement.

4. The milk pump device according to claim 1, wherein the control device is configured to establish that a pumping stroke is the residual pumping stroke.

5. The milk pump device according to claim 1, wherein the control device is configured to read in a milk measurement generated by the second milk meter at each pumping stroke.

6. The milk pump device according to claim 4, wherein the control device is configured to control the second milk meter to carry out the second milk measurement if it has been determined that the next or the current pumping stroke is the residual pumping stroke.

7. The milk pump device according to claim 4, wherein the milk pump device is configured to receive detection signals from a detection device and to identify the residual pumping stroke on the basis of the received detection signals.

8. The milk pump device according to claim 7, wherein the detection device comprises a liquid sensor disposed at a measuring position for generating a liquid signal, wherein the liquid signal forms an indication of the presence or absence of milk at the measuring position.

9. The milk pump device according to claim 7, wherein the detection device comprises a membrane sensor for generating a position signal, wherein the position signal forms an indication of a position of the membrane.

10. The milk pump device according to claim 5, wherein the control device is configured to compare milk measurements generated by the second milk meter mutually, or to compare them with a standard value, and to identify a residual pumping stroke if a milk measurement generated by the second milk meter differs by more than a predetermined threshold value from the standard value.

11. The milk pump device according to claim 1, wherein the milk measurement generated by the second milk meter is regarded as the second milk measurement if the corresponding pumping stroke is the residual pumping stroke.

12. The milk pump device according to claim 1, wherein the membrane pump comprises a pump chamber with a membrane included therein, wherein the membrane divides the pump chamber into a first space and a second space, wherein the first space is in connection with a supply, and the second space is in connection with the passage duct by means of an inflow opening and an outflow opening.

13. The milk pump device according to claim 12, wherein the membrane is designed as a hose, a first end of which is connected to the inflow opening and a second end of which is connected to the outflow opening.

14. A milking device, comprising a milk pump device according to claim 1.

15. A method for displacing an amount of milk through a passage duct by means of a membrane pump included in the passage duct, wherein the method comprises:

controlling the membrane pump to perform a number of pumping strokes;

generating a first milk measurement by means of a membrane pump which forms a first milk meter, which first milk measurement is an indication of a number of required complete pumping strokes for displacing the amount of milk;

generating a second milk measurement by means of a second milk meter of only an amount of milk displaced by a residual pumping stroke of the membrane pump; and determining the total amount of displaced milk on the basis of the first milk measurement and the second milk measurement.

16. The method according to claim 15, wherein the method further comprises identifying the residual pumping stroke.

17. The method according to claim 15, wherein the method is applied by means of a milk pump device comprising a passage duct and a membrane pump for displacing milk through the passage duct, wherein the membrane pump forms a first milk meter for generating a first milk measurement of an amount of milk displaced by a number of complete pumping strokes of the membrane pump, and the milk pump device further comprises a second milk meter for carrying out a second milk measurement of an amount of milk displaced by a residual pumping stroke, the first and second milk measurements together representing the total amount of the milk displaced by the milk pump device, wherein the membrane pump comprises a pump chamber with a membrane included therein, wherein the membrane divides the pump chamber into a first space and a second space, wherein the first space is in connection with a supply and the second space is in connection with the passage duct by means of an inflow opening and an outflow opening, and wherein the method further comprises filling the first space in order to close the passage duct.

* * * * *